United States Patent
Rajon et al.

(10) Patent No.: US 9,211,782 B2
(45) Date of Patent: Dec. 15, 2015

(54) MOTOR VEHICLE REAR MODULE INTENDED TO BE AFFIXED TO A REAR HATCH MODULE

(75) Inventors: Alexis Rajon, Lyons (FR); Arnold Fayt, Jujurieux (FR)

(73) Assignee: Compagnie Plastic Omnium, Lyons (FR)

( * ) Notice: Subject to any disclaimer, the term of this patent is extended or adjusted under 35 U.S.C. 154(b) by 1006 days.

(21) Appl. No.: 12/922,872

(22) PCT Filed: Mar. 20, 2009

(86) PCT No.: PCT/FR2009/050486
§ 371 (c)(1),
(2), (4) Date: Dec. 22, 2010

(87) PCT Pub. No.: WO2009/125111
PCT Pub. Date: Oct. 15, 2009

(65) Prior Publication Data
US 2012/0002434 A1 Jan. 5, 2012

(30) Foreign Application Priority Data
Mar. 20, 2008 (FR) ..................................... 08 51822

(51) Int. Cl.
| | |
|---|---|
| *B62D 25/04* | (2006.01) |
| *B60J 5/00* | (2006.01) |
| *F21V 29/00* | (2015.01) |
| *B60J 5/10* | (2006.01) |
| *B60Q 1/26* | (2006.01) |

(52) U.S. Cl.
CPC ............... *B60J 5/107* (2013.01); *B60Q 1/2638* (2013.01); *B60Q 1/2619* (2013.01); *Y10T 29/49826* (2015.01)

(58) Field of Classification Search
CPC .... B62D 21/152; B62D 25/08; B62D 21/155; B60R 19/18; B60R 13/0243; B60R 19/03; B60R 2019/1853; B60R 21/0136; B60R 13/0206; B60N 2/4228; B60J 5/107; B62K 3/02; A41D 13/015; B60Q 1/2619; B60Q 1/0408; B60Q 1/0491
USPC ......... 362/605, 632, 459, 487, 496, 540, 543, 362/544, 545, 546–549, 505–507; 296/146.5, 146.7, 191, 187.01, 187.03, 296/187.05, 187.11, 193.08, 203.04; 135/91–94; 160/10; 29/428; 293/120; 180/291; 241/101.71; 242/379.1; 248/345.1; 280/781; 348/148
See application file for complete search history.

(56) References Cited

U.S. PATENT DOCUMENTS

| | | | | |
|---|---|---|---|---|
| 4,532,578 | A | * | 7/1985 | Gaden et al. ................. 362/549 |
| 6,776,449 | B2 | | 8/2004 | Komatsu et al. |
| 6,860,537 | B2 | * | 3/2005 | Seksaria et al. ................ 296/56 |

(Continued)

FOREIGN PATENT DOCUMENTS

| | | |
|---|---|---|
| CN | 1458884 | 11/2003 |
| CN | 1535881 | 10/2004 |

(Continued)

*Primary Examiner* — Stephen F Husar
*Assistant Examiner* — Danielle Allen
(74) *Attorney, Agent, or Firm* — Jacox, Meckstroth & Jenkins

(57) ABSTRACT

A motor vehicle rear module for fastening on a structure of a rear door, the module has a light unit, an outer bodywork skin, this skin being adjacent at least in part to the light unit, and a shaper element arranged so as to shape the skin around the light unit.

18 Claims, 1 Drawing Sheet

(56) References Cited

U.S. PATENT DOCUMENTS

| | | |
|---|---|---|
| 6,929,308 B2 | 8/2005 | Komatsu et al. |
| 7,168,829 B2 | 1/2007 | Nagase |
| 7,380,866 B2 | 6/2008 | Saitoh |
| 2003/0107235 A1 | 6/2003 | Komatsu et al. |
| 2004/0178659 A1 | 9/2004 | Komatsu et al. |
| 2004/0202000 A1 | 10/2004 | Nagase |
| 2007/0145768 A1 | 6/2007 | Saitoh |

FOREIGN PATENT DOCUMENTS

| | | |
|---|---|---|
| CN | 1991125 | 7/2007 |
| EP | 635416 A1 | 1/1995 |
| EP | 1803594 A1 | 7/2007 |
| FR | 2819476 | 7/2002 |
| WO | 2006053547 A2 | 5/2006 |

\* cited by examiner

MOTOR VEHICLE REAR MODULE INTENDED TO BE AFFIXED TO A REAR HATCH MODULE

CROSS-REFERENCE TO RELATED APPLICATIONS

This application claims priority to PCT Application PCT/FR2009/050486 filed Mar. 20, 2009, and also to French Application No. 0851822 filed Mar. 20, 2008, which applications are incorporated herein by reference and made a part hereof.

BACKGROUND OF THE INVENTION

1. Field of the Invention

The present invention relates to the field of motor vehicle rear doors, and more particularly but not exclusively to doors having a bodywork strip that extends between two light units. The invention relates more particularly to positioning the strip relative to the light units.

2. Description of the Related Art

By way of example, document FR 2 819 476 discloses a tailgate having an outer bodywork skin that extends beneath the rear window. In particular, the outer skin may constitute a strip that is intended to act as a fuse and take up an impact without deforming the structure of the tailgate.

It is also known that a tailgate may carry light units, in particular devices having glasswork that is adjacent to the outer bodywork skin carried by the tailgate. Under such circumstances, while assembling the various elements onto the tailgate structure, the positioning of the bodywork skin relative to the light units takes a certain amount of time and can be found to be relatively complex.

SUMMARY OF THE INVENTION

The present invention seeks in particular to improve the clearances and the flush configuration between the tailgate skin and the rear light unit.

To this end, one embodiment of the invention provides a motor vehicle rear module for fastening on a structure of a rear door, the module comprising:

a light unit;

an outer bodywork skin, this skin being adjacent at least in part to the light unit; and a shaper element arranged so as to shape the skin around the light unit.

Thus, it is proposed to fit a pre-fitted module on the rear door, the module having the light unit and the bodywork skin already positioned relative to each other by means of the shaper element. Consequently, assembling the various elements on the rear door requires no more than a step of assembling the rear module on the door. Nevertheless, it should be observed that the rear module proposed by the invention is not necessarily mounted in a pre-equipped manner on the rear door, it being possible to envisage assembling the module part by part directly on the structure of the door.

Furthermore, by means of the shaper element, a positioning element is made available that presses the bodywork skin around the glasswork of the light unit, and that is generally capable of stressing the skin so as to obtain a reduced and constant clearance between the glasswork and the bodywork skin.

It should be observed that an "outer bodywork skin" is preferably constituted by an opaque bodywork element made of relatively flexible plastics material and having the function of covering the outside of the door, at least in part. For example it may be a strip that extends between two light units. The term "light unit" is used to mean a light device having a box that is closed by glasswork and that contains optical elements such as a lamp and a reflector. When the light unit is not too heavy, the skin is not only shaped around the light unit, but it also serves to support the entire weight of the light unit. It should also be observed that a "rear door structure" is a structural portion of the door, e.g. carrying the hinges of the door that are generally intended to be covered by covering elements, in particular the bodywork skin. When the door is a tailgate, it includes a rear window.

The invention may also include one or more of the following characteristics.

The shaper element comprises two portions, each fastened to a respective portion of the skin, these two portions also being fastened to each other so as to clamp the two skin portions around the light unit. Thus, the first and second portions are each secured to the skin in the vicinity of the light unit glasswork, and the fact that these portions are fastened together makes it possible to press the bodywork skin around the light unit. Before being fastened together, the two portions, and thus the corresponding portions of the skin are movable relative to each other, such that it is possible when the light unit is placed in the bodywork skin to move the portions towards each other so that they press the skin portions around the light unit, and then to fasten them together so as to lock this clamping position. Preferably, the first and second portions are disposed on opposite sides of the light unit, e.g. the first portion is fastened to the skin beneath the glasswork and the second portion is located above the glasswork. Furthermore, depending on the embodiment, the shaper elements may present a bezel shape so as to define a housing of shape complementary to the shape of the light unit, capable of clamping the surface of the box of the light unit uniformly. For example, each portion may form a half-bezel.

The module includes indexing means for indexing the light unit relative to the skin, the two portions of the shaper element, when fastened together, conserving the position of the skin relative to the light unit as imposed by said indexing means. These indexing means may be abutments, e.g. pegs, provided respectively on the skin, along the opening beside the light unit, and on the light unit, on the glasswork or close to the glasswork. While assembling the module, the indexing means thus make it possible to perform a first step of positioning the glasswork of the light unit relative to the edge of the opening in the skin so as to ensure satisfactory clearance between the glasswork and the skin, and then to perform a step of positioning the remainder of the light unit relative to the skin, thereby locking the position of the glasswork and the skin, which step is implemented when fastening together the portions of the shaper element.

At least one of the portions of the shaper element is molded integrally with the skin. Thus, this portion is an extension of the skin, e.g. in the form of a half-bezel, this extension not being visible from outside the vehicle because it is covered by the light unit. Under such circumstances, there is no need to perform a step of fastening the portion to the skin. Nevertheless, having the two portions fitted to the skin is advantageous since it can enable the skin to be shaped better.

The shaper element performs a function of locally reinforcing the skin. In addition to its function of positioning the skin and the light unit, the shaper element thus also performs a function of reinforcing the skin in the vicinity of the light unit, in particular a function of preventing the bodywork skin from denting. Thus, the element forms, at least locally, a lining for the skin, thereby possibly making it possible to reduce the general thickness of the skin.

The shaper element performs a function of absorbing impacts, in particular of absorbing insurance type impacts. An example of impacts of these types is known under the name Danner impact or AZT impact, and corresponds to an impact at a speed of about 15 kilometers per hour (km/h) against a fixed wall. Another example of an insurance impact corresponds to an impact at about 8 km/h against a corner of a wall or against a post. Thus, the module that is fitted to the door may be pre-fitted not only with light units and the bodywork skin, but also with means for absorbing rear impacts. In addition, the same part, the shaper element, is used to perform functions that are conventionally distinct, namely the function of positioning the light units and the bodywork skin, and also the impact absorption function. It should be observed that the impact absorption function may be performed by the shaper element by virtue of impact absorber ribs formed on said element, possibly honeycomb ribs.

The shaper element has an outside general shape substantially matching the inside general shape of the bodywork skin. In particular, the shaper element extends from one light unit to an opposite light unit. Thus, the shaper element forms a kind of internal lining for the bodywork skin, this lining preferably extending over substantially the entire surface area of the bodywork skin. The element may thus perform a reinforcement or anti-denting function for the skin. Because of this shape of the shaper element, it is also possible to make the bodywork skin of thickness that is smaller than a conventional bodywork skin. Furthermore, this extended shape of the shaper element enables the impact absorption function to be integrated therein.

The module includes two light units, and the bodywork skin is a strip extending between the two light units, the strip preferably being a fuse, being configured so as to be capable of taking up an external impact without deforming the structure of the door. Thus in the event of an impact, in particular an impact against another vehicle located behind the rear door, and in the event of the strip being deformed plastically, it is possible to replace the deformed fuse strip without needing to repair the remainder of the door. This function is particularly advantageous when the strip is situated at the same level as a rear bumper beam of the vehicle, or when the fuse strip is located immediately above a rear shield arranged in register with a bumper beam.

The shaper element includes sealing means preventing liquid from penetrating into the inside of the door, e.g. between the door structure and the bodywork skin. For example, the shaper element defines a waterproof housing for receiving the light unit. It can be understood that sealing not only provides waterproofing but also sealing against dirt.

Another embodiment of the invention also provides a method of assembling a module as described above, the shaper element comprising two portions, each fastened to a respective portion of the skin, the method comprising the following steps:

moving the portions of the shaper element so as to clamp the two skin portions around the light unit; and fastening the two portions together so as to lock the position of the light unit relative to the skin.

Thus, since the portions of the shaper element are secured to the skin, they are no longer integral with respective portions thereof, such that the subsequent fastening of the portions relative to the light unit, e.g. by fastening the portions to the light unit, has the effect of positioning the bodywork skin relative to the light unit and of permanently locking said positioning.

Advantageously, before the step of moving the portions of the shaper element, the method includes a step in which the skin is fastened to at least one of said portions of the shaper element. By way of example, this fastening is implemented by means of adhesive, heat-sealing, snap-fastening, stapling, screw-fastening, or indeed flattening studs.

In an implementation, the method includes a step of indexing the light unit relative to the skin, and the step of fastening the two portions of the shaper element together is implemented so that they conserve the position of the skin relative to the light unit as imposed during the indexing step.

These and other objects and advantages of the invention will be apparent from the following description, the accompanying drawings and the appended claims.

BRIEF DESCRIPTION OF THE DRAWINGS

The invention can be better understood on reading the following description given purely by way of example and made with reference to the drawing, in which.

DETAILED DESCRIPTION OF DRAWINGS

Figure 1:
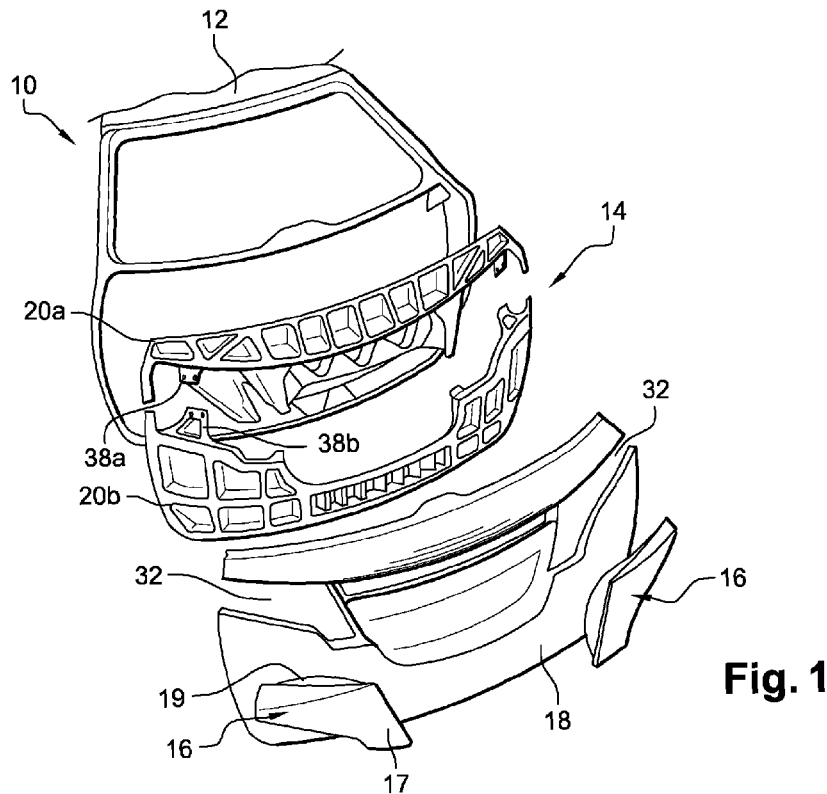
FIG. 1 is an exploded perspective view of a rear module in a first embodiment of the invention, fitted to a tailgate structure.

As can be seen in FIG. 1, a rear door 10, e.g. a tailgate, comprises firstly a structure 12 and secondly a rear module 14 fitted to the structure 12. The module 14 comprises two light units 16, an outer bodywork skin 18 adjacent at least in part to the light units 16, and a shaper element 20a, 20b for shaping the skin 18 around the light units 16.

Figures 2A, 2B, 2C:
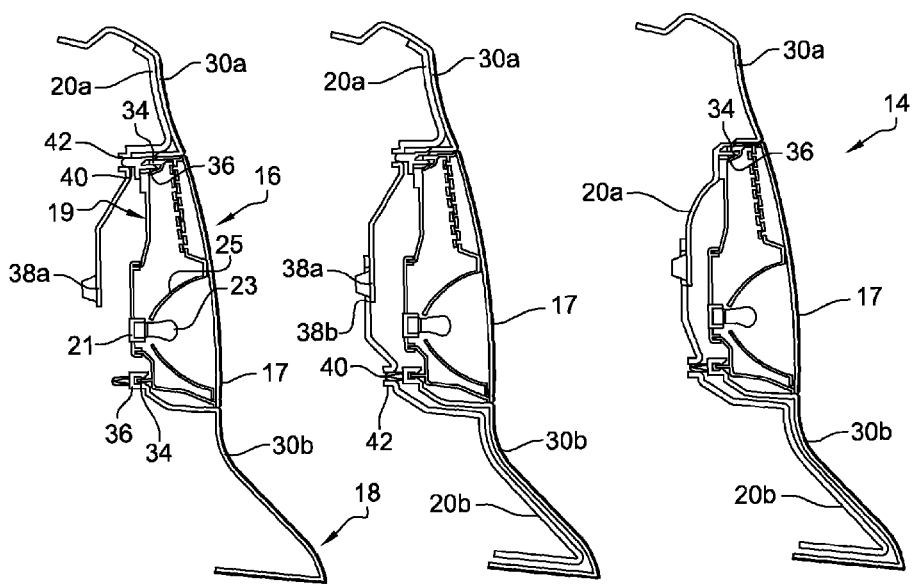
FIG. 2a is a section of the FIG. 1 module, while it is being assembled.
FIG. 2b is a view similar to FIG. 2a, during a subsequent step of the assembly method.
FIG. 2c is a view similar to FIG. 2b for a module in a second embodiment of the invention.

Each light unit 16 has glasswork 17 and a box 19. As can be seen in FIG. 2a, the box 19 is closed by the glasswork 17, so as to form a waterproof housing. Furthermore, a cover 21 is fitted to the box 19, the cover being provided in particular with a lamp 23 and a reflector 25.

In this example, the module 14 is designed to be pre-fitted and then mounted on the tailgate structure 12, with the light units 16 already in position relative to the bodywork skin 18.

Furthermore, in the example described, the shaper element 20a, 20b performs an impact absorption function, in particular a function of absorbing insurance type impacts. For this purpose, the element 20a, 20b is provided with insurance impact absorber ribs.

Still in this example, the bodywork skin 18 is a strip extending between the light units 16. In an advantageous embodiment, the strip 18 constitutes a fuse, being configured so as to be capable of taking up an external impact without deforming the structure 12 of the door 10. The strip 18 is preferably situated above a rear bumper shield (not shown), the shield covering a rear bumper beam.

The shaper element 20a, 20b comprises two portions, namely a top portion 20a and a bottom portion 20b. As can be seen in FIG. 1, the element 20a, 20b presents an outside shape that substantially matches the general inside shape of the bodywork skin 18, thereby enabling it to act as reinforcement for the skin 18. Reinforcing the skin is advantageous firstly to prevent it from twisting, particularly when the skin 18 extends over a large area and is of small thickness, and also to provide a function of opposing denting of the skin. It should be understood that "substantially matching the general inside shape of the skin" may involve a discrete bearing points between the shaper element and the skin, which points may be distributed over at least a portion of the surface of the skin 18.

In this example, the shaper element 20a, 20b performs a function of reinforcing the skin 18 over substantially its entire surface area, but it is possible to envisage the shaper element performing a localized reinforcing function for the skin. For example, the shaper element could be subdivided without extending from one light unit 16 to the other, but only in the vicinity of each of the light units 16, thereby reinforcing the skin locally around the light units so as to press the skin 18 around the light units.

The portions 20a, 20b of the shaper element are designed to be fastened to respective portions 30a, 30b of the skin 18. These portions 30a, 30b of the skin are situated at the edge of the opening 32 in the skin 18 that is to be adjacent to the light unit glasswork 17. In this example, the portions 30a and 30b are disposed respectively above and below the glasswork 17.

The rear module 14 includes indexing means 34, 36 for relative indexing between the light unit and the skin 18. In this example, the means 34 comprise an indexing peg provided on the light unit box 19 in the vicinity of the glasswork 17. The means 36 comprise an indexing slot provided in the skin 18 in the direct vicinity of the glasswork 17 so as to co-operate with the means 34 in order to impose satisfactory clearance between the glasswork 17 and the edge of the opening 32 in the skin 18.

Furthermore, the portions 20a and 20b of the shaper element include fastener means 38a, 38b for fastening the portions 20a, 20b together, this fastening being configured so as to enable the portions 30a, 30b of the skin 18 to be clamped around the light units 16. The fastener means 38a, 38b are arranged so that when the portions 20a and 20b are fastened together they conserve the relative position of the skin 18 and of the light units 16 as imposed by the indexing means 34, 36.

It should be observed that the fastener means 38a, 38b may also serve to fasten the portions 20a, 20b with the light units 16.

It should also be observed that the module 14 in this example includes indexing means 40, 42 for indexing the shaper element 20a, 20b relative to the skin 18. These means comprise more specifically pegs 40 formed on the portion 30a, 30b of the skin 18 and co-operating with orifices 42 formed in the element 20a, 20b. These means 40, 42 serve to position the portions 20a and 30a as closely as possible to the light unit glasswork 17.

Provision may also be made for sealing means that serve to make the volume extending between the structure 12 and the outer skin 18 waterproof, e.g. using one or more gaskets that are preferably located between one and the other of elements selected from the structure 12, the shaper element 20a, 20b, the light unit 16, and the skin 18.

In FIG. 1, it can be seen that the shaper element 20a, 20b performs reinforcing and absorption functions in optional manner.

A method of assembling the module 14 is described below with reference to FIGS. 2a and 2b.

In an example of the method, a first step is performed of fastening the portion 20a to the portion 30a of the skin 18. This fastening may be performed by heat-sealing, adhesive, snap-fastening, stapling, screw-fastening, or indeed by flattening studs.

There follows a second step of indexing the light unit 16 relative to the skin 18. This indexing step consists in causing the indexing means 34, 36 to co-operate so that the glasswork 17 is properly positioned relative to the edges of the openings 32 in the skin 18. FIG. 2a shows the module 14 at the end of this indexing, second step.

There follows a third step of fastening the portion 20b to the portion 30b of the skin 18. This fastening may likewise be performed by adhesive, heat-sealing, snap-fastening, stapling, screw-fastening, or by flattening studs. At the end of this third step, there follows a step of indexing the portions 20a, 20b relative to the portions 30a, 30b of the skin 18 by co-operation between the means 40, 42, and then a fourth step of moving the portions 20a, 20b so as to clamp the portions 30a, 30b of the skin 18 around the light unit 16. During this step, the portions 20a, 20b are moved towards each other so as to press the skin 18 around the light unit 16, and more precisely so as to clamp the skin around the light unit, the skin 18 thus forming a vise around the glasswork 17 with the aid of the portions 20a, 20b.

There follows a fifth step of fastening the portions 20a, 20b to each other using the fastener means 38a, 38b so as to lock the position of the light unit 16 relative to the skin 18. This fifth step may be associated, preceded, or followed by a step of fastening the light unit to the shaper element 20a, 20b.

FIG. 2b shows the module 14 at the end of these steps. It should be observed that the fifth step of fastening the two portions together is implemented so that the portions 20a, 20b conserve the position of the skin 18 relative to the light unit 16 as imposed by the indexing means 34, 36 during the indexing, second step.

As can be seen in FIG. 2c, in a module 14 in another embodiment of the invention, the portion 20a of the shaper element is not fitted to the skin 18, but forms an integral portion of the skin 18, the portion 20a being molded integrally with the portion 30a, and extending said portion 30a behind the light unit 16.

The method of assembling the module shown in FIG. 2c is similar to that of FIGS. 2a and 2b. Nevertheless, because the portion 20a is molded integrally with the skin 18 there is no first step of fastening said portion 20a to the skin 18. The following steps are similar to those for the module of FIGS. 2a and 2b.

It should be observed that the invention is not limited to the embodiments described above. In particular, in the assembly method, certain steps may be performed in a different order, or indeed may be omitted or may include additional steps. For example, the second and third steps of FIGS. 2a and 2b may be inverted, i.e. it is possible to perform the step of fastening the portion 20b to the skin 18 before the step of indexing the light unit 16 relative to the skin 18.

Furthermore, the indexing means 36 of the light unit may be provided not on the portion 30a but on the portion 20a of the shaper element, in the vicinity of the glasswork 17.

It should be observed, that by virtue of the step of indexing using the means 34, 36, stress is applied to the skin 18 to match the size of the opening 32 to the real size of the light unit 16. Such stresses might give rise to the skin 18 yawning open around the glasswork 17, which is why the presence of the shaper element 20a, 20b serves to lock the skin to the size of the opening 32.

Amongst the advantages of the invention, it should be observed that it is possible to envisage removing the light unit 16, e.g. for repair purposes or to change the lamp, without it being necessary to reposition the light unit relative to the skin 18. It is possible to remove the light unit 16 while leaving the portions 20a, 20b fastened together, such that it is subsequently possible to reinstall the light unit without losing the position imposed by the portions 20*a*, 20*b*.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A motor vehicle rear module for fastening on a structure of a rear door, said motor vehicle rear module comprising:
    a light unit;
    an outer bodywork skin, said outer bodywork skin being adjacent at least in part to said light unit; and
    a shaper element arranged so as to shape said outer bodywork skin around said light unit;
    wherein said shaper element is distinct from said outer bodywork skin; and
    wherein said shaper element is stressing said outer bodywork skin so as to obtain a reduced clearance between a glasswork and said outer bodywork skin;
    wherein said shaper element comprises two portions, each fastened to a respective portion of said outer bodywork skin, said two portions also being fastened to each other so as to clamp said two skin portions around said light unit;
    including two light units, wherein said outer bodywork skin is a strip extending between two light units, said strip preferably being a fuse, being configured so as to be taking up an external impact without deforming the structure of the rear door.

2. A motor vehicle rear module for fastening on a structure of a rear door, said motor vehicle rear module comprising:
    a light unit;
    an outer bodywork skin, said outer bodywork skin being adjacent at least in part to said light unit; and a shaper element arranged so as to shape said outer bodywork skin around said light unit
    including two light units, wherein said outer bodywork skin is a strip extending between the two light units, said strip preferably being a fuse, being configured so as to be taking up an external impact without deforming the structure of the rear door.

3. The motor vehicle rear module according to claim 2, wherein said shaper element comprises two portions, each fastened to a respective portion of said outer bodywork skin, said two portions also being fastened to each other so as to clamp said two skin portions around said light unit.

4. The motor vehicle rear module according to the claim 3, including indexing means for indexing said light unit relative to said outer bodywork skin, said two portions of said shaper element, when fastened together, conserving the position of said outer bodywork skin relative to said light unit as imposed by said indexing means.

5. The motor vehicle rear module according to claim 3, wherein at least one of the portions of said shaper element is molded integrally with said outer bodywork skin.

6. The motor vehicle rear module according to claim 3, wherein said shaper element has an outside general shape substantially matching the inside general shape of said outer bodywork skin.

7. The motor vehicle rear module according to claim 3, wherein said shaper element includes sealing means preventing liquid from penetrating into the inside of the rear door.

8. The motor vehicle rear module according to claim 7, wherein said shaper element includes sealing means preventing liquid from penetrating between the door structure and said outer bodywork skin.

9. The motor vehicle rear module according to claim 2, wherein said shaper element performs a function of absorbing impacts.

10. The motor vehicle rear module according to claim 9, wherein said impact is an impact at a speed of about 15 km/h against a fixed wall.

11. The motor vehicle rear module according to claim 9, wherein said impact is an impact at about 8 km/h against a corner of a wall or against a post.

12. The motor vehicle rear module according to claim 2, wherein said shaper element has an outside general shape substantially matching the inside general shape of said outer bodywork skin.

13. The motor vehicle rear module according to claim 2, wherein said shaper element includes sealing means preventing liquid from penetrating into the inside of the rear door.

14. The motor vehicle rear module according to claim 13, wherein said shaper element includes sealing means preventing liquid from penetrating between the door structure and said outer bodywork skin.

15. A method of assembling a module according to claim 2, said shaper element comprising two portions, each fastened to a respective portion of said outer bodywork skin, the method comprising the following steps:
    moving the portions of said shaper element so as to clamp said two skin portions around said light unit; and
    fastening said two portions together so as to lock the position of said light unit relative to said outer bodywork skin.

16. A method according to claim 15, including a step, before the step of moving the portions of said shaper element, in which step said outer bodywork skin is fastened to at least one of said portions.

17. A method according to claim 15, including a step of indexing said light unit relative to said outer bodywork skin, and the step of fastening said two portions of said shaper element together is implemented so that they conserve the position of said outer bodywork skin relative to said light unit as imposed during said indexing step.

18. The motor vehicle rear module according to claim 2, wherein a reduced clearance is a constant clearance.

\* \* \* \* \*